United States Patent
Heimer et al.

(10) Patent No.: US 11,734,833 B2
(45) Date of Patent: Aug. 22, 2023

(54) SYSTEMS AND METHODS FOR DETECTING MOVEMENT OF AT LEAST ONE NON-LINE-OF-SIGHT OBJECT

(71) Applicant: Elbit Systems C4I and Cyber Ltd., Netanya (IL)

(72) Inventors: Alon Refael Heimer, Netanya (IL); Barak Alfassi, Netanya (IL); Ilya Leizerson, Netanya (IL); Yaron Mayerowicz, Netanya (IL)

(73) Assignee: Elbit Systems C4I and Cyber Ltd., Netanya (IL)

( * ) Notice: Subject to any disclaimer, the term of this patent is extended or adjusted under 35 U.S.C. 154(b) by 0 days.

(21) Appl. No.: 18/174,664

(22) Filed: Feb. 27, 2023

(65) Prior Publication Data
US 2023/0215019 A1 Jul. 6, 2023

Related U.S. Application Data

(63) Continuation of application No. PCT/IL2021/050683, filed on Jun. 8, 2021.

(30) Foreign Application Priority Data

Aug. 30, 2020 (IL) .......................................... 277062

(51) Int. Cl.
*G06T 7/20* (2017.01)

(52) U.S. Cl.
CPC ...... *G06T 7/20* (2013.01); *G06T 2207/10016* (2013.01); *G06T 2207/10048* (2013.01)

(58) Field of Classification Search
None
See application file for complete search history.

(56) References Cited

U.S. PATENT DOCUMENTS

| 8,446,468 | B1 | 5/2013 | Medioni et al. |
| 11,436,839 | B2 * | 9/2022 | Naser .................. G06V 20/58 |
| 2011/0284724 | A1 | 11/2011 | Meyers et al. |
| 2017/0169574 | A1 | 6/2017 | Xie et al. |
| 2017/0287334 | A1 | 10/2017 | Slutsky et al. |

(Continued)

OTHER PUBLICATIONS

Looking through walls and around corners with incoherent light: wide-real time imaging through scattering media, by Katz et al., arXiv:1202.2078 (Year: 2012).*

(Continued)

*Primary Examiner* — Vikkram Bali

(57) ABSTRACT

A system and method for detecting movement of an object outside a line-of-sight of a camera is disclosed. The camera acquires images of a target that is impacted by light that is scattered from the object and by ambient light, and of a reference that is impacted by the ambient light. A processing circuitry can be configured to detect the movement of the object by calculating, for each of a plurality of acquired images, a compensated light intensity value (LIV), being a target LIV that is based on pixels in the respective acquired image that represent the target, as modified, based on a reference LIV that is based on pixels in the respective acquired image that represent the reference, to reduce an effect, on the target LIV, of changes in the ambient light during a time period between acquiring a given image and the acquiring of the respective acquired image.

20 Claims, 7 Drawing Sheets

(56) References Cited

U.S. PATENT DOCUMENTS

2018/0293739 A1   10/2018  Gupta et al.
2019/0072655 A1*  3/2019  Tan ......................... G06N 3/08

OTHER PUBLICATIONS

Tracking Objects Outside the Line of Sight Using 2D Intensity Images; 1. Klein, J., Peters, C., Martin, J., Laurenzis, M. and Hullin, M.B., 2016.
Counting Moving People by Staring at a Blank Wall ; 3. Sharma, P., 2019.
Passive Sensing Around the Corner Using Spatial Coherence.; 5. Batarseh, M., Sukhov, S., Shen, Z., Gemar, H., Rezvani, R. and Dogariu, A., 2018.
Multi-Modal Non-Line-of-Sight Passive Imaging.; IEEE Transactions on Image Processing, 28(7), pp. 3372-3382; 6. Beckus, A., Tamasan, A. and Atia, G.K., 2019.
Polarization-Informed Non-Line-of-Sight Imaging on Diffuse Surfaces; Hassan, B., 2019.
Enhancing Passive Non-Line-of-Sight Imaging Using Polarization Cues; Tanaka, K., Mukaigawa, Y. and Kadambi, A., 2019.
Computational Periscopy With an Ordinary Digital Camera.; 9. Saunders, C., Murray-Bruce, J. and Goyal, V.K., 2019.
Turning Corners Into Cameras: Principles and Methods; 10. Bouman, K.L., Ye, V., Yedidia, A.B., Durand, F., Wornell, G.W., Torralba, A. and Freeman, W.T., 2017.
Accidental Cameras: Creating Images From Shadows; (Doctoral dissertation, Massachusetts Institute of Technology); 11. Ye, V., 2018.
Accidental Pinhole and Pinspeck Cameras: Revealing the Scene Outside the Picture; 2012 IEEE Conference on Computer Vision and Pattern Recognition (pp. 374-381); 12. Torralba, A. and Freeman, W.T., Jun. 2012.
Inferring Light Fields From Shadows; IEEE Conference on Computer Vision and Pattern Recognition (pp. 6267-6275; 13. Baradad, M., Ye, V., Yedidia, A.B., Durand, F., Freeman, W.T., Womell, G.W. and Torralba, A., 2018.
Exploiting Occlusion in Non-Line-of-Sight Active Imaging.; IEEE Transactions on Computational Imaging, 4(3), pp. 419-431; 14. Thrampoulidis, C., Shulkind, G., Xu, F., Freeman, W.T., Shapiro, J.H., Torralba, A., Wong, F.N. and Wornell, G.W., 2018.
Low-Budget Transient Imaging Using Photonic Mixer Devices. ACM; Graphics (ToG), 32(4), p. 45; 16. Heide, F., Hullin, M.B., Gregson, J. and Heidrich, W., 2013.
Tracking Multiple Objects Outside the Line of Sight Using Speckle Imaging; IEEE Conference on Computer Vision and Pattern Recognition (pp. 6258-6266); 18. Smith, B.M., O'Toole, M. and Gupta, M., 2018.
A Quantitative Platform for Non-Line-of-Sight Imaging Problems; Klein J., Laurenzis M., Michels D., Hullin M. British Machine Vision Conference, 2018.
"Recovering Three-Dimensional Shape Around a Corner Using Ultrafast Time-of-Flight Imaging", Velten A., WillwacherT., Gupta O., Veeraraghavan A., Bawendi M. & Raskar R., Nature Communications vol. 3, Article No. 745 (2012).
Looking Around the Corner Using Transient Imaging; A. Kirmani, T. Hutchison, J. Davis and R. Raskar; 2009 IEEE 12th International Conference on Computer Vision, Kyoto, 2009, pp. 159-166, doi: 10.1109/ICCV.2009.5459160.
Tracking Objects Hidden From View; Genevieve Gariepy, Francesco Tonolini, Jonathan Leach, Robert Henderson, and Daniele Faccio; Optics & Photonics News 27(12), 52-52 (2016).
F. Heide, M. O'Toole, K. Zhang, D. Lindell, S. Diamond and G. Wet-zstein, "Robust Non-Line-of-Sight Imaging With Single Photon Detectors", arXiv preprint arXiv:1711.07134, 2017.
Katz O., Small E., Silberberg Y, "Looking Through Walls and Around Corners With Incoherent Light: Wide-Field Real-Time Imaging Through Scattering Media", arXiv:1202.2078, Year—2012.
Otkrist Gupta, Thomas Willwacher, Andreas Velten, Ashok Veeraraghavan, and Ramesh Raskar, "Reconstruction of Hidden 3D Shapes Using Diffuse Reflections", Opt. Express 20, 19096-19108 (2012).
Susan Chan, Ryan E. Warburton, Genevieve Gariepy, Jonathan Leach, and Daniele Faccio, "Non-Line-of-Sight Tracking of People at Long Range", Opt. Express 25, 10109-10117 (2017).
Felix Heide, Matthew O'Toole, Kai Zang, David B. Lindell, Steven Diamond, and Gordon Wetzstein, "Non-Line-of-Sight Imaging With Partial Occluders and Surface Normals", ACM Trans. Graph. 38, 3, Article 22 (Jun. 2019), 10 pages. DOI:https://doi.org/10.1145/3269977.
Boger-Lombard, J., Katz, O, "Passive Optical Time-of-Flight for Non Line-of-Sight Localization", Nat Commun 10, 3343 (2019).
Xin Lei, Liangyu He, Yixuan Tan, Ken Xingze Wang, Xinggang Wang, Yihan Du, Shanhui Fan, Zongfu Yu, "Direct Object Recognition Without Line-of-Sight Using Optical Coherence", Proceedings of the IEEE/CVF Conference on Computer Vision and Pattern Recognition (CVPR), 2019, pp. 11737-11746.
"Technique to See Objects Hidden Around Corners" (Mar. 5, 2018) retrieved Jul. 11, 2019 from https://phys.org/news/2018-03-technique-hidden-corners.html.
Gariepy, G., Tonolini, F., Henderson, R., Leach, J. and Faccio, D. "Detection and Tracking of Moving Objects Hidden From View". Nature Photonics (2016), 10(1), pp. 23-26.
David B. Lindell, Gordon Wetzstein, Vladlen Koltun; "Acoustic Non-Line-of-Sight Imaging", Proceedings of the IEEE/CVF Conference on Computer Vision and Pattern Recognition (CVPR), 2019, pp. 6780-6789.
Katherine L. Bouman, Vickie Ye, Adam B. Yedidia, Fredo Durand, Gregory W. Womell, Antonio Torralba, William T. Freeman, "Turning Corners Into Cameras: Principles and Methods", Proceedings of the IEEE International Conference on Computer Vision (ICCV), 2017, pp. 2270-2278.
P. V. K. Borges, A. Tews and D. Haddon, "Pedestrian Detection in Industrial Environments: Seeing Around Corners", 2012 IEEE/RSJ International Conference on Intelligent Robots and Systems, Vilamoura, 2012, pp. 4231-4232, doi: 10.1109/IROS.2012.6386262.
Ralph Nothdurft and Gang Yao, "Imaging Obscured Subsurface Inhomogeneity Using Laser Speckle", Opt. Express 13, 10034-10039 (2005).
Daniele Faccio, "Seeing Around Corners Non-Line-of-Sight Imaging", Optics and Photonics News, Jan. 2019.
Brandon M. Smith, Matthew O'Toole, Mohit Gupta, "Tracking Multiple Objects Outside the Line of Sight Using Speckle Imaging", Proceedings of the IEEE Conference on Computer Vision and Pattern Recognition (CVPR), 2018, pp. 6258-6266.
Klein, J., Peters, C., Martin, J. et al., "Tracking Objects Outside the Line of Sight Using 2D Intensity Images", Sci Rep 6, 32491 (2016). https://doi.org/10.1038/srep32491.
Tomohiro Maeda et al: "Recent Advances in Imaging Around Corners", arxiv.org, Cornell University Library, 201 Olin Library Cornell University Ithaca, NY 14853, Oct. 12, 2019 (Oct. 12, 2019), XP081514548, abstract figure 2c; table 2 Intensity, p. 11, right hand column.

* cited by examiner

SYSTEMS AND METHODS FOR DETECTING MOVEMENT OF AT LEAST ONE NON-LINE-OF-SIGHT OBJECT

CROSS-REFERENCE TO RELATED APPLICATION

This application is a continuation of International Patent Application No. PCT/IL2021/050683, filed Jun. 8, 2021, which is incorporated by reference herein in its entirety.

TECHNICAL FIELD

The invention relates to systems and methods for detecting movement of at least one non-line-of-sight object.

BACKGROUND

The share of the world's total population living in urban areas has been steadily increasing during the past decades and is expected to continue to increase in the future. Due to this increased urbanization, in certain occupations there is a basic need for technologies that are capable of identifying the presence of persons in an indoor space (i.e., a room) in the absence of a line-of-sight to such persons. Such occupations can include, for example, search and rescue forces, eldercare professionals, and retailers.

Previous solutions for identifying the presence of a person or an object in an indoor space in the absence of a line-of-sight to the person or object include active imaging components and involve complex image processing. Moreover, these solutions are often very costly or unreliable.

There is thus a need in the art for new systems and methods for detecting movement of at least one non-light-of-sight object.

References considered to be relevant as background to the presently disclosed subject matter are listed below. Acknowledgement of the references herein is not to be inferred as meaning that these are in any way relevant to the patentability of the presently disclosed subject matter.

Klein et al., "Tracking Objects Outside the Line of Sight Using 2D Intensity Images", Scientific Reports 6:32491, pp. 1-9, published on Aug. 31, 2016, discloses tracking occluded objects in real time using a standard 2D camera and a laser pointer. Light transport is repeatedly simulated through the scene to determine the set of object parameters that most closely fits the measured intensity distribution. It is experimentally demonstrated that this approach is capable of following the translation of unknown objects, and translation and orientation of a known object, in real time.

U.S. Patent Application Publication No. 2017/0287334, published on Oct. 5, 2017, discloses a non-line of sight obstacle detection and localization system and method of detecting and localizing a non-line of sight object including receiving reflections at a detection system of a moveable platform, the reflections including direct and multipath reflections, identifying the reflections associated with static targets to retain the reflections associated with moving targets, and distinguishing between line of sight objects and non-line of sight objects among the moving targets. The method also includes localizing the non-line of sight objects relative to the platform and indicating approaching non-line of sight objects among the non-line of sight objects, the approaching non-line of sight objects moving toward the platform on a path that intersects the platform.

Prafull Sharma, "Counting Moving People by Staring at a Blank Wall", Master's Thesis, Massachusetts Institute of Technology, June 2019, presents a passive non-line-of-sight imaging method that seeks to count hidden moving people from the observation of a uniform receiver such as a blank wall. The technique analyzes changes in indirect illumination in videos to reveal a signal that is strongly correlated with the activity taking place in the hidden part of a scene. This signal is used to predict from a video of a blank wall whether moving persons are present, and to estimate their number. To this end, a neural network is trained using data collected under a variety of viewing scenarios. We find Good overall accuracy is found in predicting whether the room is occupied by zero, one or two persons. The generalization and robustness of the method is analyzed with both real and synthetic data.

U.S. Patent Application Publication No. 2019/0072655, published on Mar. 7, 2019, discloses using an optical field sensor to make phase measurements over an area of light reflected from an object outside a field of view of the light field sensor. These phase measurements are applied to a machine learning system trained with similar phase measurements from objects outside of a field of view to identify the object within a class of objects subject to the training.

Batarseh et al., "Passive Sensing Around the Corner Using Spatial Coherence", shows that a highly scattering wall can transfer certain statistical properties of light, which, in turn, can assist in detecting objects even in non-line-of-sight conditions. It is experimentally demonstrated that the transformation of spatial coherence during the reflection of light from a diffusing wall can be used to retrieve geometric information about objects hidden around a corner and assess their location. This sensing approach is completely passive, assumes no control over the source of light, and relies solely on natural broadband illumination.

Beckus et al., "Multi-Modal Non-line-of-sight Passive Imaging", IEEE Transactions on Image Processing, 28(7), pp. 3372-3382, published on Mar. 3, 2019, considers the non-line-of-sight (NLOS) imaging of an object using the light reflected off a diffusive wall. The wall scatters incident light such that a lens is no longer useful to form an image. Instead, the 4D spatial coherence function is exploited to reconstruct a 2D projection of the obscured object. The approach is completely passive in the sense that no control over the light illuminating the object is assumed and is compatible with the partially coherent fields ubiquitous in both the indoor and outdoor environments. A multi-criteria convex optimization problem for reconstruction is formulated, which fuses the reflected field's intensity and spatial coherence information at different scales. The formulation leverages established optics models of light propagation and scattering and exploits the sparsity common to many images in different bases. This paper holds promise to advance passive imaging in the challenging NLOS regimes in which the intensity does not necessarily retain distinguishable features and provides a framework for multimodal information fusion for efficient scene reconstruction.

B. Hassan, "Polarization-Informed Non-Line-of-Sight Imaging on Diffuse Surfaces", Master's Thesis, University of California, Los Angeles, 2019, shows that polarization reveals unique information about occluded environments, and computation in the polarization domain has sparsity benefits that aid the inverse problem. This is demonstrated via non-line-of-sight imaging on rough, everyday surfaces such as office/home walls. If successful, it has the potential to enable direct and indirect occluded light source discrimination and passive shape recovery of hidden objects via shape from polarization.

Tanaka et al., "Enhancing Passive Non-Line-of-Sight Imaging Using Polarization Cues", arXiv preprint arXiv:1911.12906, presents a method of passive non-line-of-sight (NLOS) imaging using polarization cues. A key observation is that the oblique light has a different polarimetric signal. It turns out this effect is due to the polarization axis rotation, a phenomena which can be used to better condition the light transport matrix for non-line-of-sight imaging. Analysis and results show that the use of a polarizer in front of the camera is not only a separate technique, but it can be seen as an enhancement technique for more advanced forms of passive NLOS imaging. For example, it is shown that polarization can enhance passive NLOS imaging both with and without occluders. In all tested cases, despite the light attenuation from polarization optics, recovery of the occluded images is improved.

Saunders et al., "Computational Periscopy with an Ordinary Digital Camera", Nature, Vol. 565(7740), pp. 472-477, published on Jan. 24, 2019, discloses that computing the amounts of light arriving from different directions enables a diffusely reflecting surface to play the part of a mirror in a periscope—that is, perform non-line-of-sight imaging around an obstruction. A two-dimensional computational periscopy technique is introduced that requires only a single photograph captured with an ordinary digital camera. The technique recovers the position of an opaque object and the scene behind (but not completely obscured by) the object, when both the object and scene are outside the line of sight of the camera, without requiring controlled or time-varying illumination. Such recovery is based on the visible penumbra of the opaque object having a linear dependence on the hidden scene that can be modelled through ray optics.

Bouman et al., "Turning Corners into Cameras: Principles and Methods", Proceedings of the IEEE International Conference on Computer Vision, pp. 2270-2278, 2017, shows that walls, and other obstructions with edges, can be exploited as naturally-occurring "cameras" that reveal the hidden scenes beyond them. In particular, this paper demonstrates methods for using the subtle spatio-temporal radiance variations that arise on the ground at the base of a wall's edge to construct a one-dimensional video of the hidden scene behind the wall. The resulting technique can be used for a variety of applications in diverse physical settings. From standard RGB video recordings, edge cameras are used to recover 1-D videos that reveal the number and trajectories of people moving in an occluded scene. It is further shown that adjacent wall edges, such as those that arise in the case of an open doorway, yield a stereo camera from which the 2-D location of hidden, moving objects can be recovered. This technique is demonstrated in a number of indoor and outdoor environments involving varied floor surfaces and illumination conditions.

V. Ye, "Accidental Cameras: Creating Images from Shadows", Master's Thesis, Massachusetts Institute of Technology, published on Feb. 1, 2018, explores new imaging systems that arise from everyday occlusions and shadows. By modeling the structured shadows created by various occlusions, hidden scenes can be recovered. Three such imaging systems are explored. In the first, a wall corner is used to recover one-dimensional motion in the hidden scene behind the corner. Experimental results using this method are shown in several natural environments. This method is also extended to be used in other applications, such as for automotive collision avoidance systems. In the second, doorways and spheres are used to recover two-dimensional images of a hidden scene behind the occlusions. Experimental results of this method are shown in simulations and in natural environments. Finally, it is presented how to extend this approach to infer a 4D light field of a hidden scene from 2D shadows cast by a known occluder. Using the shadow cast by a real house plant, low resolution light fields with different levels of texture and parallax complexity can be recovered.

Torralba et al., "Accidental Pinhole and Pinspeck Cameras: Revealing the Scene Outside the Picture", IEEE Conference on Computer Vision and Pattern Recognition, pp. 374-381, 2012, identifies and studies two types of "accidental" images that can be formed in scenes. The first is an accidental pinhole camera image. These images are often mistaken for shadows, but can reveal structures outside a room, or the unseen shape of the light aperture into the room. The second class of accidental images are "inverse" pinhole camera images, formed by subtracting an image with a small occluder present from a reference image without the occluder. The reference image can be an earlier frame of a video sequence. Both types of accidental images happen in a variety of different situations (an indoor scene illuminated by natural light, a street with a person walking under the shadow of a building, etc.). Accidental cameras can reveal information about the scene outside the image, the lighting conditions, or the aperture by which light enters the scene.

Baradad et al., "Inferring Light Fields from Shadows", Proceeding of the IEEE Conference on Computer Vision and Pattern Recognition, pp. 6267-6275, 2018, presents a method for inferring a 4D light field of a hidden scene from 2D shadows cast by a known occluder on a diffuse wall. This is done by determining how light naturally reflected off surfaces in the hidden scene interacts with the occluder. By modeling the light transport as a linear system, and incorporating prior knowledge about light field structures, the system can be inverted to recover the hidden scene. Results of the inference method across simulations and experiments with different types of occluders are demonstrated. For instance, using the shadow cast by a real house plant, low resolution light fields with different levels of texture and parallax complexity can be recovered. Two experimental results are provided: a human subject and two planar elements at different depths.

Thrampoulidis et al., "Exploiting Occlusion in Non-Line-of-Sight Active Imaging", IEEE Transactions on Computational Imaging, 4(3), pp. 419-431, published on Nov. 16, 2017, notes that active non-line-of-sight imaging systems are of growing interest for diverse applications. The most commonly proposed approaches to date rely on exploiting time-resolved measurements, i.e., measuring the time it takes for short light pulses to transit the scene. This typically requires expensive, specialized, ultrafast lasers and detectors that must be carefully calibrated. This paper develops an alternative approach that exploits the valuable role that natural occluders in a scene play in enabling accurate and practical image formation in such settings without such hardware complexity. In particular, it is demonstrated that the presence of occluders in the hidden scene can obviate the need for collecting time-resolved measurements, and develop an accompanying analysis for such systems and their generalizations. Ultimately, the results suggest the potential to develop increasingly sophisticated future systems that are able to identify and exploit diverse structural features of the environment to reconstruct scenes hidden from view.

U.S. Patent Application Publication No. 2011/0284724, published on Nov. 24, 2011, discloses a system and method for obtaining an image of an object out of line of sight, the method comprising directing a chaotic light beam at a first area containing the object; measuring the light from the chaotic light beam at a plurality of instances in time; using a photon detector, detecting light from a second area over a plurality of instances in time; the photon detector not being in the line of sight with the first area but in line-of-sight with a second area; using a processor, correlating the information received by the photon detector with the measurement of light from the chaotic light beam at specific instances in time; and producing an image of the object.

Heide et al., "Low-Budget Transient Imaging Using Photonic Mixer Devices", ACM Transactions on Graphics (ToG), 32(4), explores the use of photonic mixer devices (PMD), commonly used in inexpensive time-of-flight cameras, as alternative instrumentation for transient imaging. A sequence of differently modulated images with a PMD sensor is obtained, a model for local light/object interaction is imposed, and an optimization procedure is used to infer transient images given the measurements and model. The resulting method produces transient images at a cost several orders of magnitude below existing methods, while simultaneously simplifying and speeding up the capture process.

U.S. Patent Application Publication No. 2018/0293739, published on Oct. 11, 2018, provides, in accordance with some embodiments, systems, methods and media for determining object motion in three dimensions using speckle images. In some embodiments, a system for three dimensional motion estimation is provided, comprising: a light source; an image sensor; and a hardware processor programmed to: cause the light source to emit light toward the scene; cause the image sensor to capture a first defocused speckle image of the scene at a first time and capture a second defocused speckle image of the scene at a second time; generate a first scaled version of the first defocused image; generate a second scaled version of the first defocused image; compare each of the first defocused image, the first scaled version, and the second scaled version to the second defocused image; and determine axial and lateral motion of the object based on the comparisons.

Smith et al., "Tracking Multiple Objects Outside the Line of Sight Using Speckle Imaging", Proceedings of the IEEE Conference on Computer Vision and Pattern Recognition, pp. 6258-6266, 2018, presents techniques for tracking non-line-of-sight (NLOS) objects using speckle imaging. A novel speckle formation and motion model is developed where both the sensor and the source view objects only indirectly via a diffuse wall. It is shown that this NLOS imaging scenario is analogous to direct LOS imaging with the wall acting as a virtual, bare (lens-less) sensor. This enables tracking of a single, rigidly moving NLOS object using existing speckle-based motion estimation techniques. However, when imaging multiple NLOS objects, the speckle components due to different objects are superimposed on the virtual bare sensor image, and cannot be analyzed separately for recovering the motion of individual objects. This paper develops a novel clustering algorithm based on the statistical and geometrical properties of speckle images, which enables identifying the motion trajectories of multiple, independently moving NLOS objects. It is demonstrated, for the first time, tracking individual trajectories of multiple objects around a corner with extreme precision (<10 microns) using only off-the-shelf imaging components.

General Description

In accordance with a first aspect of the presently disclosed subject matter, there is provided a system for detecting movement of at least one non-line-of-sight object, the system comprising: a camera capable of acquiring images of: (A) at least part of a first visible object located within a line-of-sight of the camera, being a target, the first visible object being impacted by (i) light that is scattered from the non-line-of-sight object present within a space outside the line-of-sight of the camera and (ii) ambient light, and (B) at least part of a second visible object located within the line-of-sight of the camera, being a reference, the second visible object being impacted by the ambient light; and a processing circuitry configured to: obtain a sequence of at least two successive images acquired by the camera, each of the successive images including a first set of pixels representing the target, and a second set of pixels representing the reference; analyze at least two images of the sequence for detecting the movement within the space, if any, the at least two images of the sequence being analyzed images, by calculating, for each analyzed image of the analyzed images, (a) at least one target light intensity value based on at least part of the first set of pixels in the respective analyzed image, thereby giving rise to target light intensity values for the analyzed images, (b) at least one reference light intensity value based on at least part of the second set of pixels in the respective analyzed image, thereby giving rise to reference light intensity values for the analyzed images, and (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and detect the movement within the space upon a variation between the compensated light intensity values across given images of the analyzed images meeting a criterion.

In some cases, the target light intensity value is represented by a temporal target equation and the reference light intensity value is represented by a temporal reference equation, and the processing circuitry is further configured to: infer a common signal represented in both the temporal reference equation and a part of the temporal target equation that represents a temporal change in the target light intensity value due to the ambient light that pervades into the space and illuminates the target in order to reduce a variance of the compensated light intensity values.

In some cases, the compensated light intensity value is calculated by dividing the target light intensity value by the reference light intensity value.

In some cases, the second visible object is not impacted by the light that is scattered from the non-line-of-sight object present within the space outside the line-of-sight of the camera.

In some cases, the first visible object and the second visible object are a common object, and wherein the at least part of the first visible object and the at least part of the second visible object do not entirely overlap.

In some cases, the camera is a thermal camera or a multispectral camera.

In some cases, at least some of the ambient light is emitted by an external non-natural light source for illuminating the non-line-of-sight object.

In some cases, the light source is a Continuous Wave (CW) laser.

In some cases, the processing circuitry is further configured to automatically select the target by analyzing at least one image of the sequence.

In some cases, the processing circuitry is further configured to automatically select the reference by analyzing at least one image of the sequence.

In some cases, the space is a room and the first visible object is an internal wall of the room.

In some cases, the space is a room and the second visible object is an external wall of the room.

In some cases, the space is lighted by at least one of: one or more internal light sources or light entering through an opening of the space.

In some cases, the criterion is a predefined temporal variation between the compensated light intensity values across the given images that is met or exceeded.

In some cases, the predefined temporal variation is a predefined change in a temporal spectrum content, a wavelet content, or both.

In some cases, the system further comprises a second camera, having a higher sampling rate than a sampling rate of the camera, and the processing circuitry is further configured to: obtain a second sequence of at least two second successive images acquired by the second camera, each of the second successive images including a third set of pixels representing the target; analyze at least two second images of the second sequence, the at least two second images of the second sequence being second analyzed images, by calculating, for each second analyzed image of the second analyzed images, at least one second target light intensity value based on at least part of the third set of pixels in the respective second analyzed image, thereby giving rise to second target light intensity values for the second analyzed images; and correct the target light intensity values, based on the second target light intensity values, to at least reduce a second effect of second changes in an internal light of given internal light sources within the space on the target light intensity values.

In accordance with a second aspect of the presently disclosed subject matter, there is provided a system for detecting movement of at least one non-line-of-sight object, the system comprising: a movable camera capable of acquiring, while moving, images of at least part of a first visible object located within a line-of-sight of the camera, the first visible object being impacted by light that is scattered from the non-line-of-sight object within a space outside the line-of-sight of the camera; and a processing circuitry configured to: obtain a sequence of at least two successive images acquired by the camera, each of the successive images including a respective set of pixels, wherein at least a subset of the respective set of pixels represent at least part of the first visible object, being a target; register into a common coordinate system at least the respective set of pixels of a first image of the sequence, giving rise to a first registered image, and the respective set of pixels of a second image of the sequence, giving rise to a second registered image, wherein the first image is acquired from a first position of the camera and the second image is acquired from a second position of the camera, different than the first position, and wherein the registration enables identifying the target within the first registered image and within the second registered image; calculate at least one target light intensity value for the first registered image and the second registered image based on at least part of the respective set of pixels representing the target in the respective registered image, thereby giving rise to target light intensity values for the first registered image and the second registered image; and detect the movement within the space upon a variation in the target light intensity value between the first registered image and the second registered image meeting a criterion.

In some cases, the system further comprises at least one inertial sensor affixed to the camera, and the register is also based on readings from the inertial sensor.

In some cases, the movable camera is mounted on one of: an aircraft, a ground vehicle, a nautical vehicle, a fixed surface, or a person.

In some cases, the movable camera is gimbaled.

In some cases, the processing circuitry is further configured to maintain a line-of-sight of the movable camera to the first visible object.

In some cases, the processing circuitry is further configured, before detecting the movement, to compensate for differences in sensitivity of different pixels and their offsets on values of light intensity of the different pixels in the first registered image and the second registered image that are associated with a same area of the target.

In accordance with a third aspect of the presently disclosed subject matter, there is provided a method for detecting movement of at least one non-line-of-sight object, the method comprising: obtaining a sequence of at least two successive images acquired by a camera, each of the successive images including a first set of pixels representing a target, being at least part of a first visible object located within a line-of-sight of the camera, and a second set of pixels representing a reference, being at least part of a second visible object located within the line-of-sight of the camera, wherein the first visible object is impacted by (i) light that is scattered from the non-line-of-sight object present within a space outside the line-of-sight of the camera and (ii) ambient light, and wherein the second visible object is impacted by the ambient light; analyzing at least two images of the sequence for detecting the movement within the space, if any, the at least two images of the sequence being analyzed images, by calculating, for each analyzed image of the analyzed images, (a) at least one target light intensity value based on at least part of the first set of pixels in the respective analyzed image, thereby giving rise to target light intensity values for the analyzed images, (b) at least one reference light intensity value based on at least part of the second set of pixels in the respective analyzed image, thereby giving rise to reference light intensity values for the analyzed images, and (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and detecting the movement within the space upon a variation between the compensated light intensity values across given images of the analyzed images meeting a criterion.

In some cases, the target light intensity value is represented by a temporal target equation and the reference light intensity value is represented by a temporal reference equation, and wherein the method further comprises: inferring a common signal represented in both the temporal reference equation and a part of the temporal target equation that represents a temporal change in the target light intensity value due to the ambient light that pervades into the space and illuminates the target in order to reduce a variance of the compensated light intensity values.

In some cases, the compensated light intensity value is calculated by dividing the target light intensity value by the reference light intensity value.

In some cases, the second visible object is not impacted by the light that is scattered from the non-line-of-sight object present within the space outside the line-of-sight of the camera.

In some cases, the first visible object and the second visible object are a common object, and the at least part of the first visible object and the at least part of the second visible object do not entirely overlap.

In some cases, the camera is a thermal camera or a multispectral camera.

In some cases, at least some of the ambient light is emitted by an external non-natural light source for illuminating the non-line-of-sight object.

In some cases, the light source is a Continuous Wave (CW) laser.

In some cases, the method further comprises: automatically selecting the target by analyzing at least one image of the sequence.

In some cases, the method further comprises: automatically selecting the reference by analyzing at least one image of the sequence.

In some cases, the space is a room and the first visible object is an internal wall of the room.

In some cases, the space is a room and the second visible object is an external wall of the room.

In some cases, the space is lighted by at least one of: one or more internal light sources or light entering through an opening of the space.

In some cases, the criterion is a predefined temporal variation between the compensated light intensity values across the given images that is met or exceeded.

In some cases, the predefined temporal variation is a predefined change in a temporal spectrum content, a wavelet content, or both.

In some cases, the method further comprises: obtaining a second sequence of at least two second successive images acquired by a second camera, having a higher sampling rate than a sampling rate of the camera, each of the second successive images including a third set of pixels representing the target; analyzing at least two second images of the second sequence, the at least two second images of the second sequence being second analyzed images, by calculating, for each second analyzed image of the second analyzed images, at least one second target light intensity value based on at least part of the third set of pixels in the respective second analyzed image, thereby giving rise to second target light intensity values for the second analyzed images; and correcting the target light intensity values, based on the second target light intensity values, to at least reduce a second effect of second changes in an internal light of given internal light sources within the space on the target light intensity values.

In accordance with a fourth aspect of the presently disclosed subject matter, there is provided a method for detecting movement of at least one non-line-of-sight object, the method comprising: obtaining a sequence of at least two successive images acquired by a movable camera, each of the successive images including a respective set of pixels, wherein at least a subset of the respective set of pixels represent a target, being at least part of a first visible object located within a line-of-sight of the camera, the first visible object being impacted by light that is scattered from the non-line-of-sight object within a space outside the line-of-sight of the camera; registering into a common coordinate system at least the respective set of pixels of a first image of the sequence, giving rise to a first registered image, and the respective set of pixels of a second image of the sequence, giving rise to a second registered image, wherein the first image is acquired from a first position of the camera and the second image is acquired from a second position of the camera, different than the first position, and wherein the registration enables identifying the target within the first registered image and within the second registered image; calculating at least one target light intensity value for the first registered image and the second registered image based on at least part of the respective set of pixels representing the target in the respective registered image, thereby giving rise to target light intensity values for the first registered image and the second registered image; and detecting the movement within the space upon a variation in the target light intensity value between the first registered image and the second registered image meeting a criterion.

In some cases, at least one inertial sensor is affixed to the camera, and the registering is also based on readings from the inertial sensor.

In some cases, the movable camera is mounted on one of: an aircraft, a ground vehicle, a nautical vehicle, a fixed surface, or a person.

In some cases, the movable camera is gimbaled.

In some cases, the method further comprises: maintaining a line-of-sight of the movable camera to the first visible object.

In some cases, the method further comprises: compensating for differences in sensitivity of different pixels and their offsets on values of light intensity of the different pixels in the first registered image and the second registered image that are associated with a same area of the target, before detecting the movement.

In accordance with a fifth aspect of the presently disclosed subject matter, there is provided a non-transitory computer readable storage medium having computer readable program code embodied therewith, the computer readable program code, executable by at least one processor of a computer to perform a method for detecting movement of at least one non-line-of-sight object, the method comprising: obtaining a sequence of at least two successive images acquired by a camera, each of the successive images including a first set of pixels representing a target, being at least part of a first visible object located within a line-of-sight of the camera, and a second set of pixels representing a reference, being at least part of a second visible object located within the line-of-sight of the camera, wherein the first visible object is impacted by (i) light that is scattered from the non-line-of-sight object present within a space outside the line-of-sight of the camera and (ii) ambient light, and wherein the second visible object is impacted by the ambient light; analyzing at least two images of the sequence for detecting the movement within the space, if any, the at least two images of the sequence being analyzed images, by calculating, for each analyzed image of the analyzed images, (a) at least one target light intensity value based on at least part of the first set of pixels in the respective analyzed image, thereby giving rise to target light intensity values for the analyzed images, (b) at least one reference light intensity value based on at least part of the second set of pixels in the respective analyzed image, thereby giving rise to reference light intensity values for the analyzed images, and (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and detecting the movement within the space upon a variation between the compensated light intensity values across given images of the analyzed images meeting a criterion.

In accordance with a sixth aspect of the presently disclosed subject matter, there is provided a non-transitory computer readable storage medium having computer readable program code embodied therewith, the computer readable program code, executable by at least one processor of a computer to perform a method for detecting movement of at least one non-line-of-sight object, the method comprising: obtaining a sequence of at least two successive images acquired by a movable camera, each of the successive images including a respective set of pixels, wherein at least a subset of the respective set of pixels represent a target, being at least part of a first visible object located within a line-of-sight of the camera, the first visible object being impacted by light that is scattered from the non-line-of-sight object within a space outside the line-of-sight of the camera; registering into a common coordinate system at least the respective set of pixels of a first image of the sequence, giving rise to a first registered image, and the respective set of pixels of a second image of the sequence, giving rise to a second registered image, wherein the first image is acquired from a first position of the camera and the second image is acquired from a second position of the camera, different than the first position, and wherein the registration enables identifying the target within the first registered image and within the second registered image; calculating at least one target light intensity value for the first registered image and the second registered image based on at least part of the respective set of pixels representing the target in the respective registered image, thereby giving rise to target light intensity values for the first registered image and the second registered image; and detecting the movement within the space upon a variation in the target light intensity value between the first registered image and the second registered image meeting a criterion.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
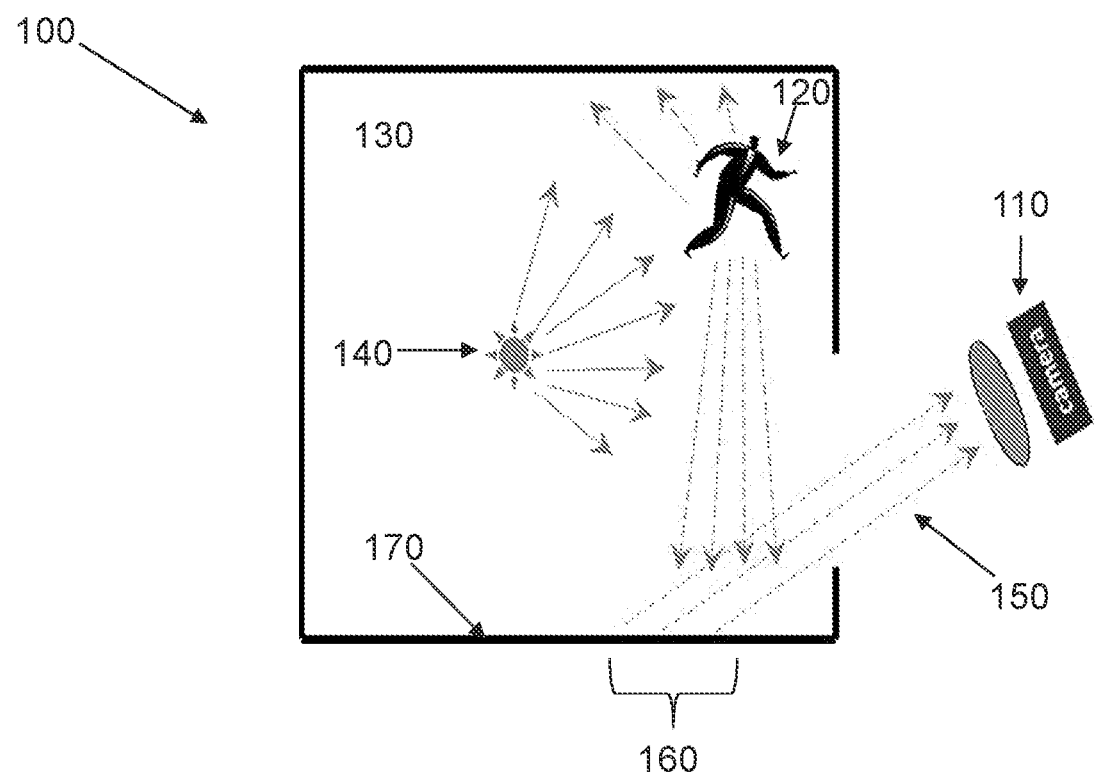
FIG. 1 is an exemplary schematic illustration of a camera that collects secondary scatterings of light from a non-line-of-sight (NLOS) object, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "detecting", "acquiring", "obtaining", "analyzing", "calculating", "subtracting", "selecting", "correcting", "registering", "maintaining", "compensating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
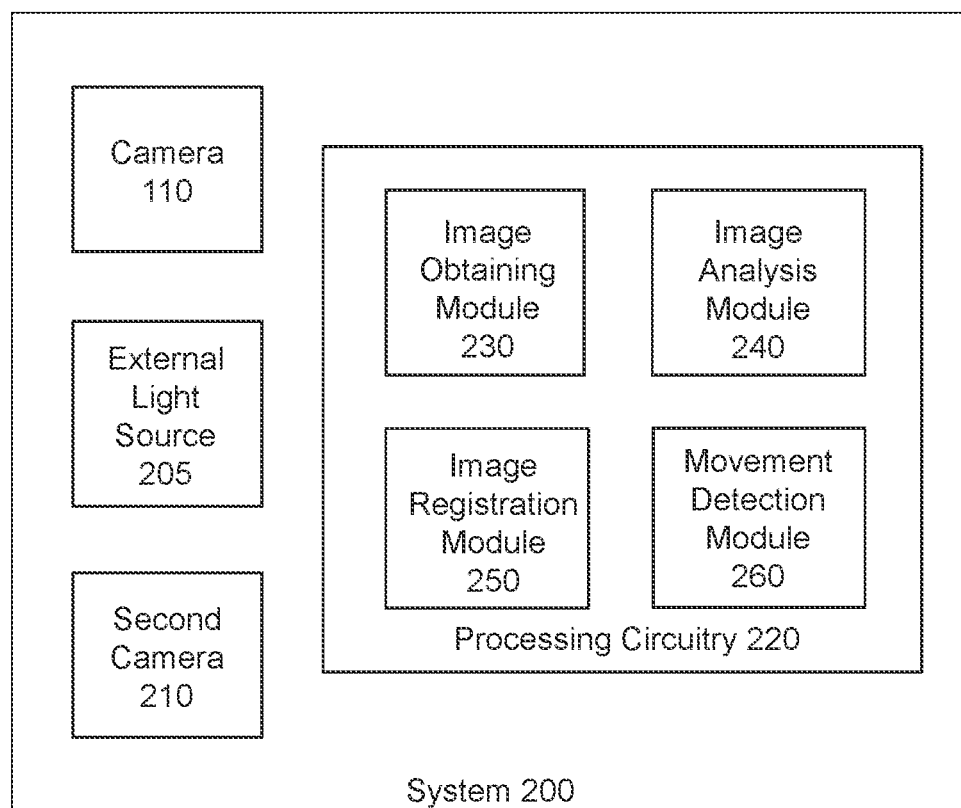
FIG. 2 is a block diagram schematically illustrating an example of a system for detecting movement of at least one non-line-of-sight (NLOS) object within a space outside the line-of-sight of the camera, in accordance with the presently disclosed subject matter.
Figure 3:
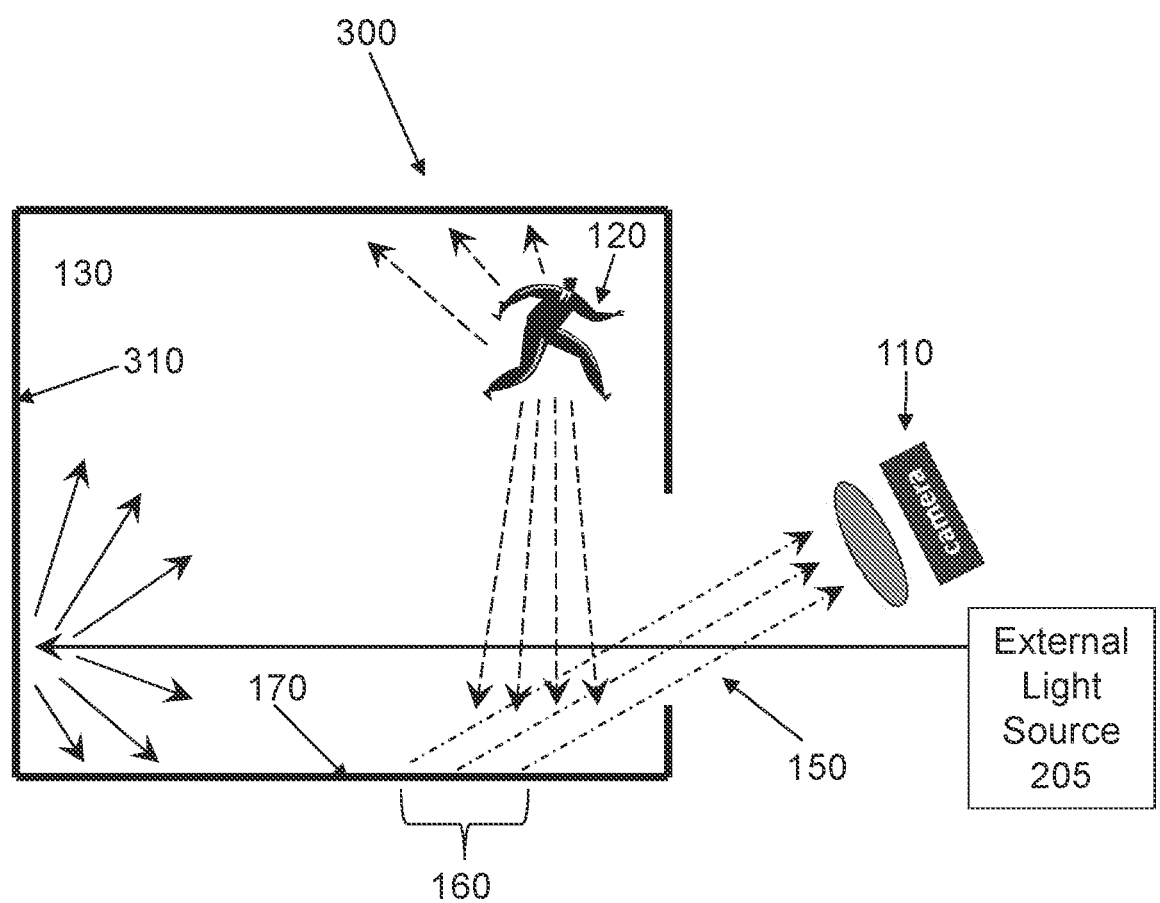
FIG. 3 is a schematic illustration of an exemplary arrangement of an external non-natural light source with respect to the space, in accordance with the presently disclosed subject matter.
Figure 4:
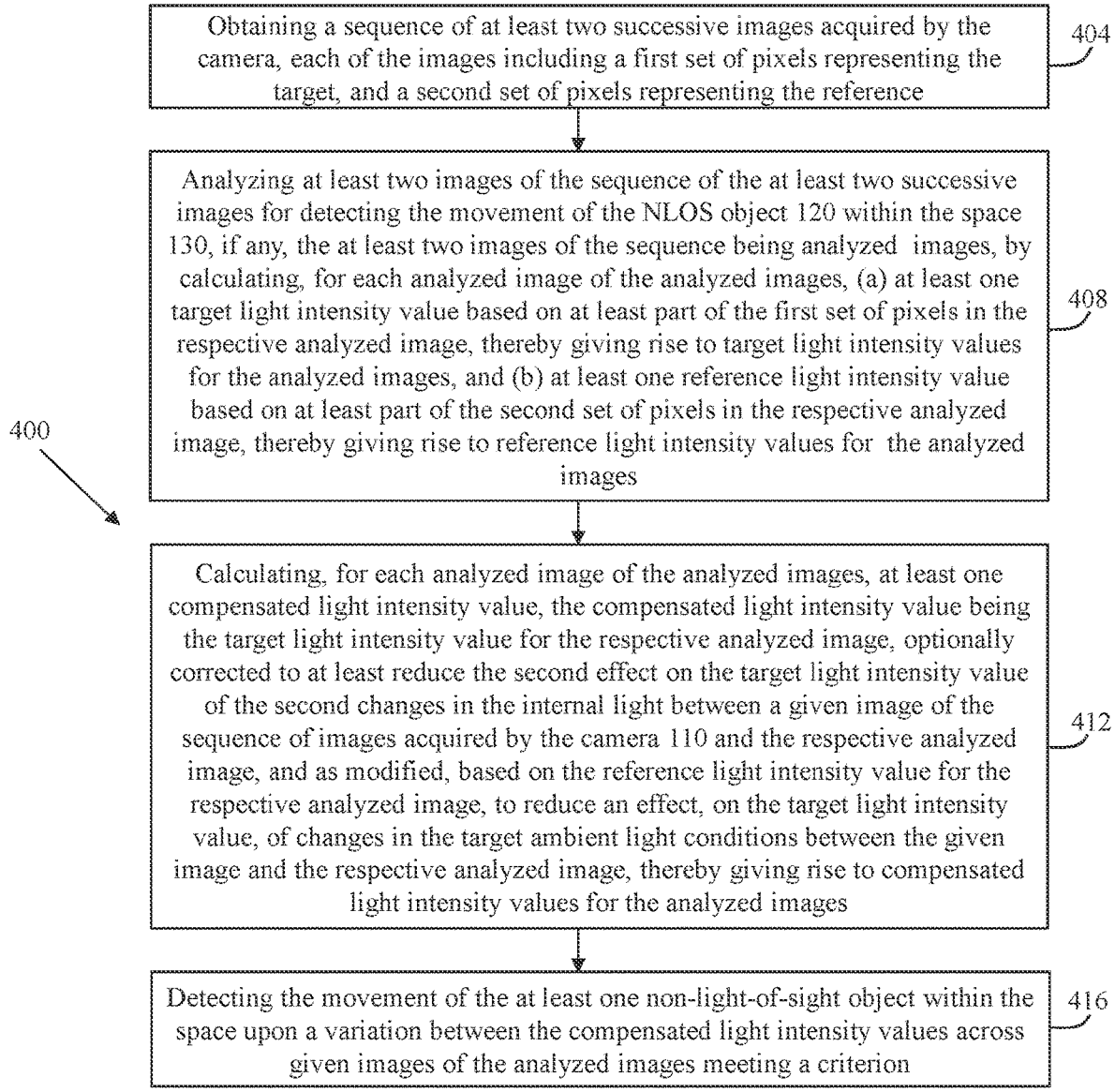
FIG. 4 is a flowchart illustrating an example of a first method for detecting movement of the NLOS object within a space outside the line-of-sight of the camera, in accordance with the presently disclosed subject matter.
Figure 7:
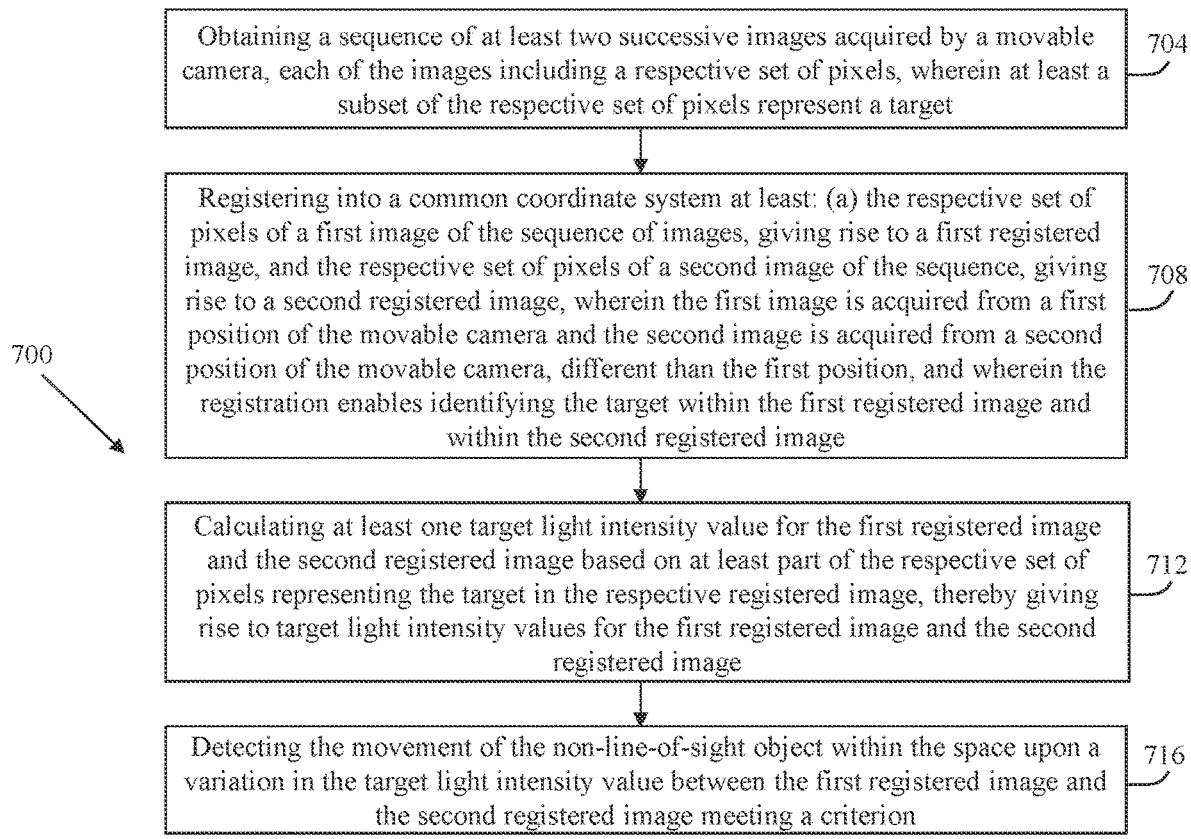
FIG. 7 is a flowchart illustrating an example of a second method for detecting movement of the NLOS object within a space outside the line-of-sight of the camera, in accordance with the presently disclosed subject matter.

In embodiments of the presently disclosed subject matter, fewer, more and/or different stages than those shown in FIGS. 4 and 7 may be executed. In embodiments of the presently disclosed subject matter one or more stages illustrated in FIGS. 4 and 7 may be executed in a different order and/or one or more groups of stages may be executed simultaneously. FIGS. 1 to 3 illustrate general schematics of the architecture of a system for identifying movement of at least one non-line-of-sight object, in accordance with embodiments of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, an exemplary schematic illustration 100 of a camera 110 that collects secondary scatterings of light from a non-line-of-sight (NLOS) object 120, in accordance with the presently disclosed subject matter.

Figure 5:
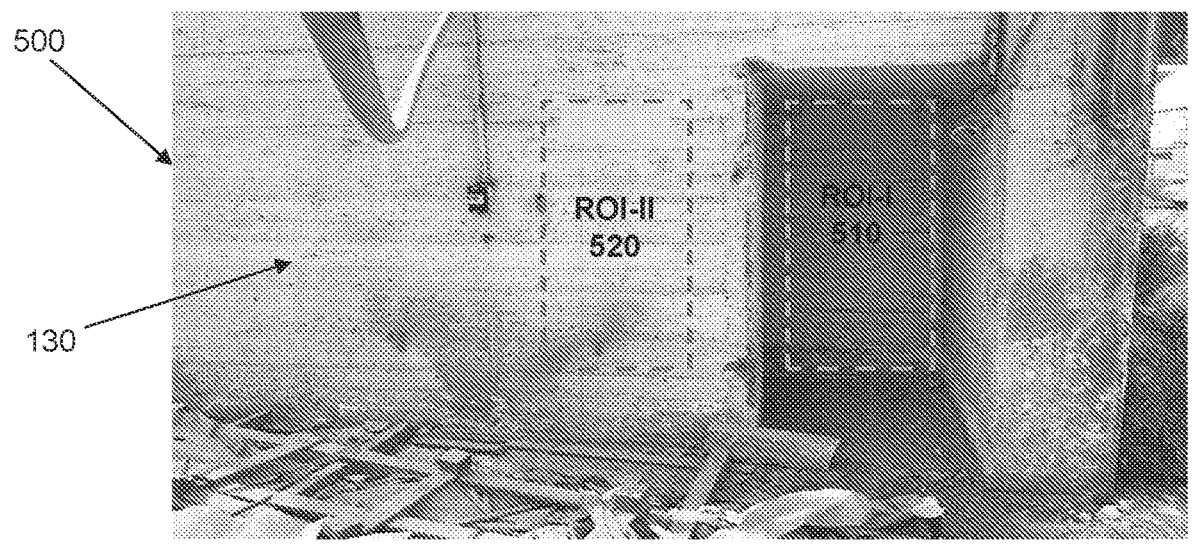
FIG. 5 is a schematic illustration of an exemplary environment in which the first method can be implemented, in accordance with the presently disclosed subject matter.

In accordance with the presently disclosed subject matter, the NLOS object 120 (e.g., a person) moves within a space 130. In some cases, as illustrated in FIGS. 1, 3 and 5, the space 130 can be a room.

Moreover, the NLOS object 120 is located outside a line-of-sight (LOS) of the camera 110. In some cases, the camera 110 can be a thermal camera, a multispectral camera or a camera that captures light in a specific spectral band. In some cases, the camera 110 can comprise a spectral filter that transmits a specific light wavelength band.

The space 130 and, by extension, the NLOS object 120 can be illuminated by light from one or more light sources 140. In some cases, one or more of the light sources 140 can be an internal light source, internal to and associated with the space 130 (e.g., a fluorescent light source). Additionally, or alternatively, in some cases, one or more of the light sources 140 can be an ambient light source, the ambient light source being an external light source that is external to the space 130 (i.e., not associated with the space 130) (e.g., the sun, light projector, Continuous Wave (CW) laser or other laser, or other external light source that is not associated with the space 130), and wherein the ambient light that is emitted by the ambient light source enters through an opening of the space 130, e.g. via one or more gaps or openings in the outer walls of the space 130 and/or via one or more windows.

Camera 110 can be configured to collect scattered light from a region that is within its LOS. For the purposes of illustration only, in the illustration of FIG. 1, camera 110 collects scattered light 150 that is scattered from a part 160 of an inner wall 170 of the space 130, the part 160 of the inner wall 170 being within the LOS of the camera 110. The scattered light 150 includes secondary scatterings of light from throughout the space 130 (e.g., walls, ceiling, floor, objects, etc.) including, inter alia, from the NLOS object 120, the secondary scatterings of light being light that is scattered at least once prior to being scattered from the region that is within the LOS of the camera 110.

Camera 110 can be configured to acquire a sequence of at least two successive images of the region that is within the LOS of the camera 110, e.g. the part 160 of the inner wall 170, based on the scattered light 150 that is collected by the camera 110 at a corresponding at least two time instances. As detailed further herein, inter alia with reference to FIGS. 4, 5, 6A, 6C and 7, movement of the NLOS object 120 within the space 130 between the at least two time instances results in a change in the light intensity within at least part of the region that is within LOS of the camera 110, being, for example, the part 160 of the inner wall 170, between the at least two time instances. Accordingly, by analyzing at least two images of the sequence of images of the region that is within the LOS of the camera 110, being, for example, the part 160 of the inner wall 170, movement of the NLOS object 120 within the space 130 during a time interval between the at least two images can be detected.

In some cases, the at least two images in the sequence that are analyzed can be successive images in the sequence of images acquired by the camera 110, wherein an interval between each pair of images of the successive images is uniform or otherwise known by the processing circuitry that analyzes the successive images. Alternatively, in some cases, the at least two images in the sequence that are analyzed are not successive images acquired by the camera 110, wherein an interval between each pair of images of the at least two images in the sequence that are analyzed is known by the processing circuitry that performs the analysis. For each pair of images of the at least two images in the sequence that are analyzed, a separation in time between the respective pair of images must be less than a given time interval to enable detecting movement of the NLOS object 120 within the space 130.

Attention is now drawn to FIG. 2, a block diagram schematically illustrating an example of a system 200 for detecting movement of at least one NLOS object 120 (hereinafter, "the NLOS object 120") within a space 130 outside the line-of-sight of the camera 110, in accordance with the presently disclosed subject matter.

In accordance with the presently disclosed subject matter, system 200 is configured to include a camera 110. Camera 110 is capable of acquiring a sequence of at least two successive images, as detailed further herein, inter alia with reference to FIGS. 4 to 7.

In some cases, system 200 can be configured to include an external non-natural light source 205 for illuminating the NLOS object 120, the external non-natural light source 205 being an ambient light source, as defined above. In some cases, by illuminating the NLOS object 120 with an external non-natural light source 205, movement of the NLOS object 120 can be more easily detected. In some cases, external non-natural light source 205 can be a Continuous Wave (CW) laser. Additionally, or alternatively, in some cases, external non-natural light source 205 can be a flashlight, a different laser or another light projector.

Attention is now briefly drawn to FIG. 3, a schematic illustration of an exemplary arrangement of an external non-natural light source 205 with respect to the space 130, in accordance with the presently disclosed subject matter. In some cases, the external non-natural light source 205 can illuminate a second inner wall 310 of the space 130 opposite the external non-natural light source 205. As detailed earlier herein, inter alia with reference to FIG. 1, external non-natural light source 205 can illuminate or contribute to the illumination of the space 130 and, by extension, the NLOS object 120. The description of the collection of the scattered light 150 by camera 110, the scattered light 150 including secondary scatterings of light from the NLOS object 120, is described above in the description of FIG. 1. The external non-natural light source 205 may be modulated with one or more predefined temporal characteristics.

Returning to FIG. 2, in some cases, system 200 can also be configured to include a second camera 210, having a higher sampling rate than a sampling rate of the camera 110. Second camera 210 is capable of acquiring a second sequence of at least two second successive images, as detailed further herein, inter alia with reference to FIG. 3.

System 200 further comprises processing circuitry 220. Processing circuitry 220 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 200 resources and for enabling operations related to system 200 resources.

Processing circuitry 220 can be configured to include the following modules: an image obtaining module 230, an image analysis module 240, optionally an image registration module 250, and a movement detection module 260.

Processing circuitry 220 can be configured, e.g. using image obtaining module 230, to obtain the sequence of at least two successive images acquired by the camera 110, as detailed further herein, inter alia with reference to FIGS. 4, 5 and 7. In some cases, processing circuitry 220 can also be configured, e.g. using image obtaining module 230, to obtain the second sequence of at least two second successive images acquired by the second camera 210, as detailed further herein, inter alia with reference to FIG. 4.

Processing circuitry 220 can also be configured, e.g. using image analysis module 240, to analyze at least two images of the sequence of the successive images acquired by the camera 110, as detailed further herein, inter alia with reference to FIGS. 4 and 7. Moreover, in some cases, processing circuitry 220 can be configured, e.g. using image analysis module 240, to analyze at least two second images of the second sequence of the second successive images acquired by the second camera 210, as detailed further herein, inter alia with reference to FIG. 4.

In some cases, processing circuitry 220 can be configured, e.g. using image registration module 250, to register into a common coordinate system at least (a) a first image of the sequence of the images acquired by the camera 110, being a movable camera 110, giving rise to a first registered image, and (b) a second image of the sequence of the images acquired by the movable camera 110, giving rise to a second registered image, as detailed further herein, inter alia with reference to FIG. 7.

Processing circuitry 220 can be further configured, e.g. using movement detection module 260, to detect movement of the NLOS object 120 within a space 130 outside the line-of-sight of the camera 110, as detailed further herein, inter alia with reference to FIGS. 4, 6A, 6C and 7.

Attention is now drawn to FIG. 4, a flowchart illustrating an example of a first method 400 for detecting movement of the NLOS object 120 within a space 130 outside the line-of-sight (LOS) of the camera 110, in accordance with the presently disclosed subject matter.

In accordance with the presently disclosed subject matter, to implement the first method 400, a target and a reference are selected. The target is selected to be at least part of a first visible object that is: (a) located within a LOS of the camera 110, (b) impacted by light that is scattered from the NLOS object 120 present within the space 130 outside the LOS of the camera 110, and (c) impacted by ambient light (e.g., sunlight or light from a light projector or flashlight). Accordingly, movement of the NLOS object 120 within the space 130 outside the LOS of the camera 110 results in changes in the light that impacts the target. Moreover, changes in ambient light conditions (direction, power, spectrum, polarization, etc.) of the ambient light that impacts the target, i.e. target ambient light conditions, results in changes in the light that impacts the target.

The reference is selected to be at least part of a second visible object that is: (a) located within a LOS of the camera 110, and (b) impacted by the ambient light that impacts the target. Accordingly, changes in ambient light conditions (direction, power, spectrum, polarization, etc.) of the ambient light that impacts the reference, i.e. reference ambient light conditions, results in changes in the light that impacts the reference. Moreover, movement of the NLOS object 120 within the space 130 outside the LOS of the camera 110 does not result in changes in the light that impacts the reference.

As illustrated in FIG. 5, a schematic illustration of an exemplary environment 500 in which the first method 400 can be implemented, in some cases the target can be first region-of-interest (ROI-I) 510, being part of an internal wall of the space 130 (e.g., a room) in which the NLOS object 120 (not shown in FIG. 5) is present, and the reference can be second region-of-interest (ROI-II) 520, being part of an external wall of the space 130.

In some cases (not as illustrated in FIG. 5), the first visible object and the second visible object can be a common object, e.g. an internal wall of the space 130, such that the target can be a first part of the common object and the reference can be a second part of the common object that does not entirely overlap the first part of the common object.

Implementation of the first method 400 requires that the interior of the space 130 be lighted, e.g. by at least one of: internal light from at least one internal light source that is internal to the space 130 (e.g., a fluorescent light source), or ambient light, defined earlier herein, inter alia with reference to FIG. 1. Some of the light that lights the interior of the space 130 impinges on the NLOS object 120 present within the space 130 outside the LOS of the camera 110. In turn, some of the light that impinges on the NLOS object 120 is scattered off of the NLOS object 120. At least some of the light that is scattered off of the NLOS object 120 directly or indirectly impacts the target (e.g., ROI-I 510), thereby enabling implementation of the first method 400.

Turning to the steps of the first method 400, processing circuitry 220 can be configured, e.g. using image obtaining module 230, to obtain a sequence of at least two successive images acquired by the camera 110, each of the images including a first set of pixels representing the target (e.g., ROI-I 510), and a second set of pixels representing the reference (e.g., ROI-II 520) (block 404).

In some cases, processing circuitry 220 can be configured to automatically select the target (e.g., ROI-I 510) by analyzing at least one image of the sequence of images acquired by the camera 110 and obtained by processing circuitry 220. Additionally, or alternatively, in some cases, processing circuitry 220 can be configured to automatically select the reference (e.g., ROI-II 520) by analyzing at least one image of the sequence.

Processing circuitry 220 can be configured, e.g. using image analysis module 240, to analyze at least two images of the sequence of the at least two successive images acquired by the camera 110 for detecting the movement of the NLOS object 120 within the space 130, if any, the at least two images of the sequence being analyzed images, by calculating, for each analyzed image of the analyzed images, (a) at least one target light intensity value based on at least part of the first set of pixels in the respective analyzed image, thereby giving rise to target light intensity values for the analyzed images, and (b) at least one reference light intensity value based on at least part of the second set of pixels in the respective analyzed image, thereby giving rise to reference light intensity values for the analyzed images (block 408). The target light intensity values can vary across the analyzed images as a result of (i) the movement of the NLOS object 120 within the space 130 outside the LOS of the camera 110 over a first time period during which the analyzed images are acquired, and (ii) changes in the target ambient light conditions over the first time period. The reference light intensity values can vary across the analyzed images as a result of changes in the reference ambient light conditions over the first time period, and not as a result of the movement of the NLOS object 120 within the space 130 outside the LOS of the camera 110 over the first time period.

In some cases, the analyzed images can be successive images acquired by the camera 110, wherein an interval between each pair of images of the analyzed images is uniform or otherwise known by the processing circuitry 220. Alternatively, in some cases, the analyzed images are not successive images acquired by the camera 110, wherein an interval between each pair of images of the analyzed images is known by the processing circuitry 220. For each pair of images of the analyzed images, a separation in time between the respective pair of images must be less than a given time interval to enable detecting movement of the NLOS object 120 within the space 130.

In some cases, for each analyzed image of the analyzed images, (a) the target light intensity value can be an average level of light intensity within the at least part of the first set of pixels in the respective analyzed image, referred to hereinafter as a target average level of light intensity for the respective analyzed image, and (b) the reference light intensity value can be an average level of light intensity within the at least part of the second set of pixels in the respective analyzed image, referred to hereinafter as a reference average level of light intensity for the respective analyzed image.

In some cases, the target (e.g., ROI-510) can be divided into a plurality of non-overlapping target regions that together complete the target (e.g., ROI-510), and the reference (e.g., ROI-520) can be divided into a plurality of non-overlapping reference regions that together complete the reference (e.g., ROI-520). Each target region of the target regions can include respective first pixels of the first set of pixels representing the target (e.g., ROI-510), and each reference region of the reference regions can include respective second pixels of the second set of pixels representing the reference (e.g., ROI-520). In such cases, for a respective analyzed image of the analyzed images, a plurality of target light intensity values (e.g., target average levels of light intensity) can be calculated corresponding to the plurality of target regions, each target light intensity value of the target light intensity values being calculated based on at least part of the first pixels within a respective target region of the target regions. Moreover, for the respective analyzed image, a plurality of reference light intensity values (e.g., reference average levels of light intensity) can be calculated corresponding to the plurality of reference regions, each reference light intensity value of the reference light intensity values being calculated based on at least part of the second pixels within a respective reference region of the reference regions.

Figure 6A:
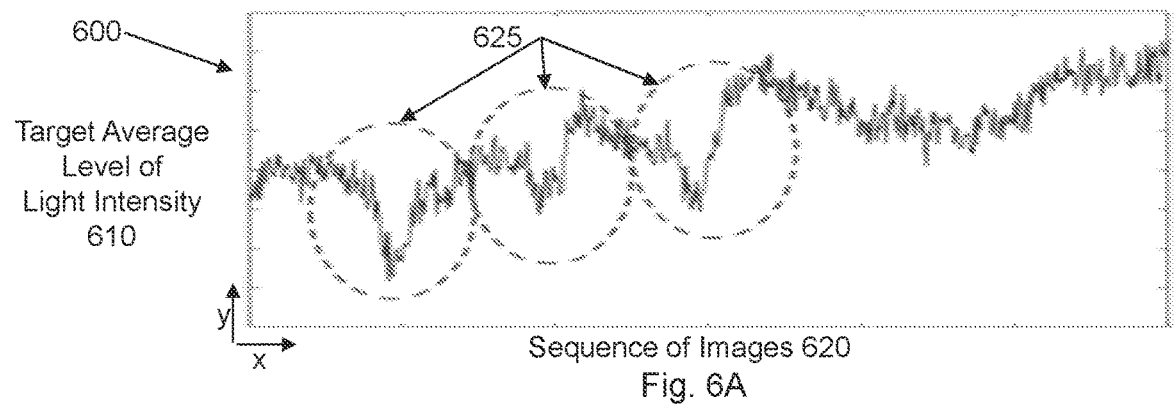
FIG. 6A is an exemplary target light intensity graph that illustrates variations in a target average level of light intensity across the sequence of images acquired by the camera, in accordance with the presently disclosed subject matter.
Figure 6B:
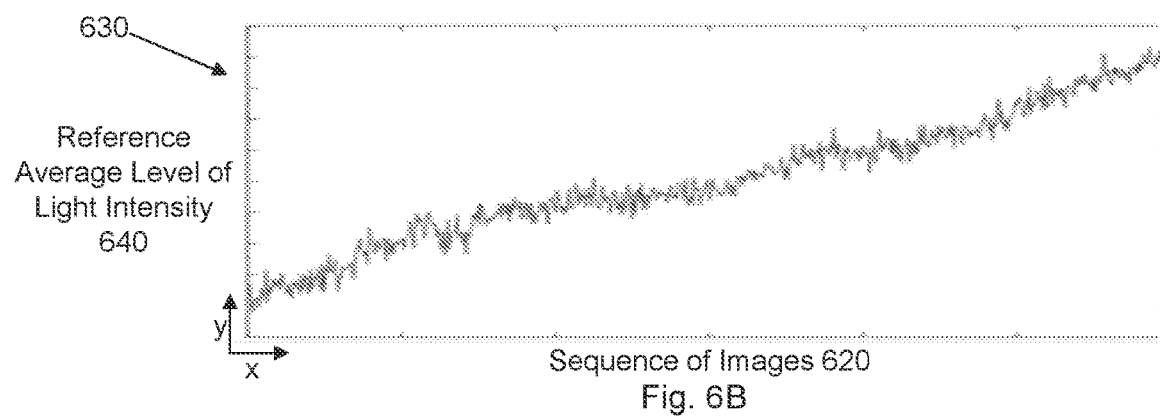
FIG. 6B is an exemplary reference light intensity graph that illustrates variations in a reference average level of light intensity across the sequence of images, in accordance with the presently disclosed subject matter.

Attention is now briefly drawn to FIGS. 6A and 6B. FIG. 6A is an exemplary target light intensity graph 600 that illustrates variations in a target average level of light intensity 610 across the sequence of images 620 acquired by the camera 110, in accordance with the presently disclosed subject matter. The variations in the target average level of light intensity 610 that are encompassed by first dotted ovals 625 result from (i) the movement of the NLOS object 120 within the space 130 outside the LOS of the camera 110 over a second time period during which given images of the sequence of images 620 are acquired by the camera 110, and (ii) changes in the target ambient light conditions over the second time period. Moreover, the variations in the target average level of light intensity 610 that are not encompassed by the first dotted ovals 625 result from changes in the target ambient light conditions.

FIG. 6B is an exemplary reference light intensity graph 630 that illustrates variations in a reference average level of light intensity 640 across the sequence of images 620, in accordance with the presently disclosed subject matter. The variations in the reference average level of light intensity 640 result from changes in the reference ambient light conditions over the first time period during which the sequence of images 620 is acquired by the camera 110.

In some cases, the target light intensity values can vary across the sequence of images (e.g., 620) based on second changes in the internal light of one or more given internal light sources within the space 130 across the sequence of images (e.g., 620). In some cases, the changes in the internal light of a respective internal light source of the given internal light sources can result from a flickering of an alternating current (AC) power source that powers the respective internal light source. Additionally, or alternatively, in some cases, the changes in the internal light of a respective internal light source of the given internal light sources can result from light fluctuations that are intrinsic to the respective internal light source (e.g. light fluctuations from a ceiling fan that is coupled to the respective internal light source, etc.).

In order to compensate for the variations in the target light intensity values based on the second changes in the internal light of the given internal light sources, in some cases, processing circuitry 220 can be configured, e.g. using image obtaining module 230, to obtain a second sequence of at least two second successive images acquired by second camera 210 concurrently to obtaining a sequence of at least two successive images acquired by the camera 110, each of the second successive images acquired by second camera 210 including a third set of pixels representing the target (e.g., ROI-I 510). The sampling rate of the second camera 210 is higher than the sampling rate of the camera 110, such that the second camera 210 is characterized by a lower signal-to-noise ratio (SNR) than the camera 110.

Processing circuitry 220 can also be configured, e.g. using image analysis module 240, to analyze at least two second images of the second sequence, the at least two second images being second analyzed images, by calculating, for each second analyzed image of the second analyzed images, at least one second target light intensity value based on at least part of the third set of pixels in the respective second analyzed image, thereby giving rise to second target light intensity values for the second analyzed images. Since the second camera 210 is characterized by a lower SNR than the camera 110, the second camera 210 is not capable of detecting the subtle differences in the light within the target (e.g., ROI-I 510) due to the motion of the NLOS object 120. Accordingly, the second target light intensity values can vary across the second analyzed images as a result of the second changes in the internal light of the given internal light sources within the space 130 and the changes in the target ambient light conditions over a third time period during which the second analyzed images are acquired, and not as a result of the movement of the NLOS object 120 within the space 130 outside the LOS of the camera 110 over the third time period. In some cases, the third time period can be the first time period. In view of the foregoing, processing circuitry 220 can be configured, e.g. using image analysis module 240, to correct the target light intensity values calculated for the analyzed images acquired by the camera 110, based on the second target light intensity values calculated for the second analyzed images acquired by the second camera 210, to at least reduce a second effect of the second changes in the internal light of the given internal light sources on the target light intensity values.

Attention is now redrawn to the first method 400. In accordance with the first method 400, processing circuitry 220 can be configured, e.g. using image analysis module 240, to calculate, for each analyzed image of the analyzed images, at least one compensated light intensity value. The compensated light intensity value for a respective analyzed image can be the target light intensity value for the respective analyzed image, optionally corrected to at least reduce the second effect, on the target light intensity value, of the second changes in the internal light between a given image (e.g., initial image) of the sequence of images (e.g., 620) acquired by the camera 110 and the respective analyzed image, and as modified, based on the reference light intensity value for the respective analyzed image, to reduce an effect, on the target light intensity value, of changes in the target ambient light conditions between the given image and the respective analyzed image. This gives rise to compensated light intensity values for the analyzed images (block 412).

In some cases, the compensated light intensity value for each analyzed image can be calculated based on a mathematical operation that includes a relation between the target light intensity value for the respective analyzed image and the reference light intensity value for the respective analyzed image. For example, the compensated light intensity value for a respective analyzed image can be calculated by dividing the target light intensity value for the respective analyzed image by the reference light intensity value for the respective analyzed image. In some cases, as detailed earlier herein, the target light intensity value for the respective analyzed image that is used for the calculation of the compensated light intensity value for the respective analyzed image can be the target light intensity value based on the at least part of the first set of pixels in the respective analyzed image, corrected to at least reduce a second effect of the second changes in the internal light of given internal light sources.

Figure 6C:
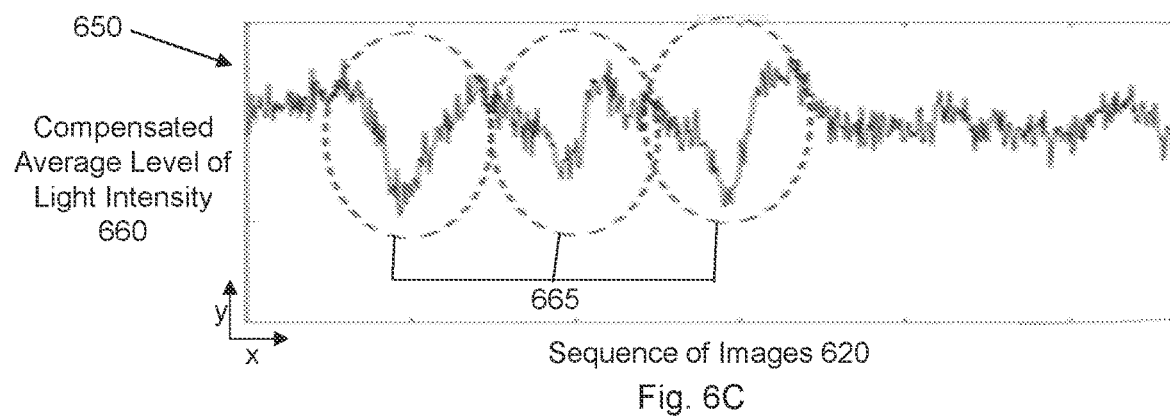
FIG. 6C is an exemplary compensated light intensity graph that illustrates variations in a compensated average level of light intensity across the sequence of images, in accordance with the presently disclosed subject matter.

In some cases, in which the target light intensity values for the analyzed images represent the target average level of light intensity (e.g., 610) of the analyzed images and the reference light intensity values for the analyzed images represent the reference average level of light intensity (e.g., 640) of the analyzed images, the compensated light intensity values for the analyzed images can represent a compensated average level of light intensity for the analyzed images, as illustrated in FIG. 6C.

Attention is now briefly drawn to FIG. 6C, an exemplary compensated light intensity graph 650 that illustrates variations in a compensated average level of light intensity 660 across the sequence of images 620, in accordance with the presently disclosed subject matter. It is to be noted that creation of the graph 650 assumes that a target average level of light intensity 610 and a reference average level of light intensity 640 is calculated for each image in the sequence of images 620 acquired by the camera 110, such that a compensated average level of light intensity 660 is calculated for each image in the sequence of images 620 with the exception of the first image in the sequence of images 620. The variations in the compensated average level of light intensity 660 that are encompassed by second dotted ovals 665 result from the movement of the NLOS object 120 within the space 130 outside the LOS of the camera 110 over the second time period, defined above.

By analyzing the compensated light intensity values across the sequence of images 620, detection of the movement of the NLOS object 120 can be achieved with greater certainty, as can be seen from a cursory glance at FIG. 6C.

In some cases, for each analyzed image of the analyzed images, the target light intensity value for the respective analyzed image can be represented by a temporal target equation and the reference light intensity value for the respective analyzed image can be represented by a temporal reference equation. In some cases, system 200 can be configured to infer a common signal represented in both (a) the temporal reference equation and (b) a part of the temporal target equation that represents a temporal change in the target light intensity value due to the ambient light that pervades into the space 130 and illuminates the target (e.g., ROI-I 510) in order to reduce a variance of the compensated light intensity values. The representation of the common signal can appear in both (a) the temporal reference equation and (b) the part of the temporal target equation in explicit form or in a more complex form. The inferring of the common signal can be achieved, for example, using machine learning (e.g., deep learning) techniques.

In some cases, the temporal target equation for each analyzed image can be as follows:

$$I_{IN} = R_{W1}*L_{IN}(t) + (R_{W1})^2*R_H(t)*L_{IN}(t) = (1+R_{W1}*R_H(t))*R_{W1}*L_{IN}(t),$$ (Equation 1)

wherein $I_{IN}$ represents the target light intensity value for the respective analyzed image;

wherein $L_{IN}(t)$ represents the temporal dependent ambient light intensity of the ambient light that pervades into the space 130 and illuminates the target (e.g., ROI-I 510) at the time that the respective analyzed image is acquired;

wherein $R_{W1}$ represents the reflection coefficient of light waves that impinge on the inner walls of the space 130, including the target (e.g., ROI-I 510); and wherein $R_H(t)$ represents the temporal dependent reflection coefficient of light waves that impinge on the NLOS object 120 at the time that the respective analyzed image is acquired.

Equation 1 assumes that the space 130 is not illuminated by internal light from an internal light source that is internal to the space 130.

In some cases, the temporal reference equation for each analyzed image can be as follows:

$$I_{OUT}=R_{W2}*L_{OUT}(t)=R_{W2}*L_{IN}(t)+R_{W2}*L_D(t),$$ (Equation 2)

wherein $I_{OUT}$ represents the reference light intensity value for the respective analyzed image;

wherein $L_{OUT}(t)$ represents the temporal dependent light intensity of the light that illuminates the reference (e.g., ROI-II 520) at the time that the respective analyzed image is acquired;

wherein $R_{W2}$ represents the reflection coefficient of light waves that impinge on the reference (e.g., ROI-II 520); and wherein $L_D(t)$ represents the temporal dependent ambient light intensity of ambient light, e.g. direct sunlight, that illuminates the reference (e.g., ROI-II 520) and that does not illuminate the target (e.g., ROI-I 510) at the time that the respective analyzed image is acquired.

In some cases, $L_D(t)$ can be zero.

In some cases, the coefficients $R_{W1}$ and $R_{W2}$ can be different. For example, in the case in which the target is part of an inner wall of the space 130 and the reference is part of an outer wall of the space 130, e.g. as illustrated in FIG. 5, the coefficients $R_{W1}$ and $R_{W2}$ can be different (but are not necessarily different). Alternatively, in some cases, the coefficients $R_{W1}$ and $R_{W2}$ can be the same. For example, in the case in which both the target and the reference are a part of an inner wall of the space 130, the coefficients $R_{W1}$ and $R_{W2}$ can be the same.

In some cases, processing circuitry 220 can be configured, prior to performing the first method 400 and based on acquired images of the target (e.g., ROI-510) and the reference (e.g., ROI-II 520), to determine the coefficients, i.e. the multiplicative factors, for the temporal target equation and the temporal reference equation (e.g., coefficients $R_{W1}$ and $R_H(t)$ of Equation 1 and coefficient $R_{W2}$ of Equation 2).

Processing circuitry 220 can be configured, e.g. using movement detection module 260, to detect the movement of the NLOS object 120 within the space 130 upon a variation between the compensated light intensity values across given images of the analyzed images meeting a criterion (block 416).

In some cases, the criterion can be a predefined absolute or relative value of a difference in magnitude between the compensated light intensity values across the given images that is met or exceeded. Additionally, or alternatively, in some cases, the criterion can be a predefined temporal variation between the compensated light intensity values across the given images that is met or exceeded, the predefined temporal variation being for example a predefined change in a temporal spectrum (i.e., harmonics) content, a wavelet content, or both.

Attention is now drawn to FIG. 7, a flowchart illustrating an example of a second method 700 for detecting movement of at least one non-line-of-sight (NLOS) object 120 within a space 130 outside the line-of-sight (LOS) of the camera 110, being a movable camera 110, during movement of the camera 110, in accordance with the presently disclosed subject matter.

In accordance with the presently disclosed subject matter, in some cases, the second method 700 can be implemented in conjunction with the first method 400. That is, each of the images that are acquired by the movable camera 110 can include a first set of pixels representing a target (e.g., ROI-I 510), the target (e.g., ROI-I 510) being at least part of a first visible object located within a line-of-sight of the camera 110, the first visible object being impacted by (i) light that is scattered from the non-line-of-sight object present within a space 130 outside the line-of-sight of the camera 110 and (ii) ambient light. Moreover, each of the images can include a second set of pixels representing a reference (e.g., ROI-II 520), the reference (e.g., ROI-II 520) being at least part of a second visible object located within the line-of-sight of the camera 110, the second visible object being impacted by the ambient light. In some cases, the target (e.g., ROI-I 510) and the reference (e.g., ROI-II 520) can be selected as described in FIG. 4.

In some cases, each of the images that are acquired by the movable camera 110 for the implementation of the second method 700 can include a respective set of pixels that represent a target (e.g., 160), the target (e.g., ROI-I 510) being at least part of a first visible object located within a line-of-sight of the camera 110, the first visible object being impacted by light that is scattered from the non-line-of-sight object within a space 130 outside the line-of-sight of the camera 110. In some cases, the target can be selected as described in FIG. 4. Attention is drawn to FIGS. 1 and 3, which illustrate an environment in which the second method 700 can be implemented based on images that capture only the target, the target being, for example, a part 160 of the inner wall 170 of the space 130. In the second method 700, due to the movement of the movable camera 110, the part 160 of the inner wall 170 of the space 130 can vary over time.

Implementation of the second method 700 requires that the interior of the space 130 be lighted, e.g. by at least one of: internal light from at least one internal light source that is internal to the space 130 (e.g., a fluorescent light source), or ambient light, defined earlier herein, inter alia with reference to FIG. 1. For example, at least some of the ambient light can be emitted by an external non-natural light source 205, as detailed earlier herein, inter alia with reference to FIG. 3. Some of the light that illuminates the interior of the space 130 impinges on the NLOS object 120 present within the space 130 outside the LOS of the movable camera 110. In turn, some of the light that impinges on the NLOS object 120 is scattered off of the NLOS object 120. At least some of the light that is scattered off of the NLOS object 120 directly or indirectly impacts the target (e.g., 160, 510), thereby enabling implementation of the second method 700.

In some cases, the movable camera 110 can be mounted on one of: an aircraft, a ground vehicle, a nautical vehicle, a fixed surface, or a person. Additionally, or alternatively, in some cases, the movable camera 110 can be gimbaled.

Turning to the steps of the second method 700, processing circuitry 220 can be configured, e.g. using image obtaining module 230, to obtain a sequence of at least two successive images (e.g., 620) acquired by the movable camera 110. Each of the images include a respective set of pixels, wherein at least a subset of the respective set of pixels represent a target (e.g., 160, 510) (block 704). In some cases, as detailed earlier herein, the respective set of pixels in the images can include a first set of pixels representing a target (e.g., ROI-I 510), and a second set of pixels representing a reference (e.g., ROI-II 520). In some cases, as detailed earlier herein, inter alia with reference to FIG. 4, the first visible object including the target and the second visible object including the reference can be different parts of a common object.

Due to the movement of the movable camera 110 during the acquisition of the sequence of images (e.g., 620) by the movable camera 110, the respective set of pixels of at least a subset of the images in the sequence of images (e.g., 620) varies across the sequence of images (e.g., 620). To compensate for this variation, processing circuitry 220 can be configured, e.g. using image registration module 250, to register into a common coordinate system at least: (a) the respective set of pixels of a first image of the sequence of images (e.g., 620), giving rise to a first registered image, and (b) the respective set of pixels of a second image of the sequence (e.g., 620), giving rise to a second registered image, wherein the first image is acquired from a first position of the movable camera 110 and the second image is acquired from a second position of the movable camera 110, different than the first position, and wherein the registration enables identifying the target within the first registered image and within the second registered image (block 708). In some cases, in which the respective set of pixels includes a first set of pixels representing the target and a second set of pixels representing the reference, the registration can enable identifying both the target and the reference within the first registered image and within the second registered image.

In some cases, at least one inertial sensor can be affixed to the movable camera 110. Registration into the common coordinate system can also be based on readings from the inertial sensor.

In some cases, processing circuitry 220 can be configured to maintain a line-of-sight of the movable camera 110 to the first visible object including the target (e.g., 160, 510). Moreover, in some cases, in which the respective set of pixels includes a second set of pixels representing a reference, processing circuitry 220 can also be configured to maintain a line-of-sight of the movable camera 110 to the second visible object including the reference (e.g., 520).

Processing circuitry 220 can be configured, e.g. using image analysis module 240, to calculate at least one target light intensity value for the first registered image and the second registered image based on at least part of the respective set of pixels representing the target (e.g., 160, 510) in the respective registered image, thereby giving rise to target light intensity values for the first registered image and the second registered image (block 712).

In some cases, the target light intensity value for the first registered image and the second registered image can be a target average level of light intensity (e.g., 610) for the respective registered image. In some cases, the target (e.g., 160, 510) can be divided into a plurality of non-overlapping target regions that together complete the target (e.g., 160, 510), as detailed earlier herein, inter alia with reference to FIG. 4. In such cases, for each of the first registered image and the second registered image, a plurality of target light intensity values (e.g., target average levels of light intensity) can be calculated corresponding to the plurality of target regions, each target light intensity value of the target light intensity values being calculated based on at least part of the respective pixels within a respective target region of the target regions.

In some cases, the target light intensity values can each be represented by a temporal target equation, as detailed earlier herein, inter alia with reference to FIG. 4. Moreover, in some cases, the coefficients in the temporal target equation can be determined prior to performing the second method 700, as detailed earlier herein, inter alia with reference to FIG. 4.

In some cases, the target light intensity values in the first registered image and the second registered image can be corrected to at least reduce a second effect of second changes in the internal light of given internal light sources within the space 130 on the target light intensity values, as detailed earlier herein, inter alia with reference to FIG. 4.

In some cases, processing circuitry 220 can be configured to compensate for the effect of differences in sensitivity of different pixels and their offsets on the values of light intensity of the different pixels in the first registered image and the second registered image that are associated with a same area of an object (e.g., the target or the reference).

In some cases, in which the images acquired by the movable camera 110 include a respective set of pixels that only represent a target, processing circuitry 220 can be configured, e.g. using movement detection module 260, to detect the movement of the NLOS object 120 within the space 130 upon a variation in a target light intensity value between the first registered image and the second registered image meeting a criterion (block 716).

In some cases, the criterion can be a predefined absolute or relative value of a difference in magnitude between the target light intensity values of the first registered image and the second registered image that is met or exceeded. Additionally, or alternatively, in some cases, the criterion can be a predefined temporal variation between the target light intensity values of the first registered image and the second registered image that is met or exceeded, the predefined variation being for example a predefined change in a temporal spectrum (i.e., harmonics) content, a wavelet content, or both.

In some cases, in which the images acquired by the movable camera 110 comprise a respective set of pixels that include a first set of pixels representing a target (e.g., 510) and a second set of pixels representing a reference (e.g., 520), processing circuitry 220 can be configured, e.g. using movement detection module 260, to detect the movement of the NLOS object 120 within the space 130 upon a variation in a compensated light intensity value (e.g., compensated average value of light intensity) between the first registered image and the second registered image meeting a criterion, the compensated light intensity values being calculated based on corresponding target light intensity values and reference light intensity values, as detailed earlier herein, inter alia with reference to FIG. 4

In some cases, the reference light intensity values can each be represented by a temporal reference equation, as detailed earlier herein, inter alia with reference to FIG. 4. Moreover, in some cases, the coefficients in the temporal reference equation can be determined prior to performing the second method 700, as detailed earlier herein, inter alia with reference to FIG. 4.

In some cases, the criterion can be a predefined absolute or relative value of a difference in magnitude between the compensated light intensity values of the first registered image and the second registered image that is met or exceeded. Additionally, or alternatively, in some cases, the criterion can be a predefined temporal variation between the compensated light intensity values of the first registered image and the second registered image that is met or exceeded, the predefined temporal variation being for example a predefined change in a temporal spectrum (i.e., harmonics) content, a wavelet content, or both.

It is to be noted that, with reference to FIGS. 4 and 7, some of the blocks can be integrated into a consolidated block or can be broken down to a few blocks and/or other blocks may be added. It is to be further noted that some of the blocks are optional. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for detecting movement of at least one non-line-of-sight object, the system comprising:
   a camera capable of acquiring images of:
   (A) at least part of a first visible object located within a line-of-sight of the camera, being a target, the first visible object being impacted by (i) light that is scattered from the non-line-of-sight object present within a space outside the line-of-sight of the camera and (ii) ambient light, and
   (B) at least part of a second visible object located within the line-of-sight of the camera, being a reference, the second visible object being impacted by the ambient light; and
   a processing circuitry configured to:
   obtain a sequence of at least two successive images acquired by the camera, each of the successive images including a first set of pixels representing the target, and a second set of pixels representing the reference;
   analyze at least two images of the sequence for detecting the movement within the space, if any, the at least two images of the sequence being analyzed images, by calculating, for each analyzed image of the analyzed images,
   (a) at least one target light intensity value based on at least part of the first set of pixels in the respective analyzed image, thereby giving rise to target light intensity values for the analyzed images,
   (b) at least one reference light intensity value based on at least part of the second set of pixels in the respective analyzed image, thereby giving rise to reference light intensity values for the analyzed images, and
   (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and
   detect the movement within the space upon a variation between the compensated light intensity values across given images of the analyzed images meeting a criterion.

2. The system of claim 1, wherein: (a) the target light intensity value is represented by a temporal target equation and (b) the reference light intensity value is represented by a temporal reference equation, and wherein the processing circuitry is further configured to:
   infer a common signal represented in both the temporal reference equation and a part of the temporal target equation that represents a temporal change in the target light intensity value due to the ambient light that pervades into the space and illuminates the target in order to reduce a variance of the compensated light intensity values.

3. The system of claim 1, wherein the compensated light intensity value is calculated by dividing the target light intensity value by the reference light intensity value.

4. The system of claim 1, wherein the second visible object is not impacted by the light that is scattered from the non-line-of-sight object present within the space outside the line-of-sight of the camera.

5. The system of claim 4, wherein the first visible object and the second visible object are a common object, and wherein the at least part of the first visible object and the at least part of the second visible object do not entirely overlap.

6. The system of claim 1, wherein at least some of the ambient light is emitted by an external non-natural light source for illuminating the non-line-of-sight object.

7. The system of claim 1, wherein the processing circuitry is further configured to automatically select the target by analyzing at least one image of the sequence.

8. The system of claim 1, wherein the processing circuitry is further configured to automatically select the reference by analyzing at least one image of the sequence.

9. The system of claim 1, wherein the criterion is a predefined temporal variation between the compensated light intensity values across the given images that is met or exceeded.

10. The system of claim 1, further comprising a second camera, having a higher sampling rate than a sampling rate of the camera, and wherein the processing circuitry is further configured to:
    obtain a second sequence of at least two second successive images acquired by the second camera, each of the second successive images including a third set of pixels representing the target;
    analyze at least two second images of the second sequence, the at least two second images of the second sequence being second analyzed images, by calculating, for each second analyzed image of the second analyzed images, at least one second target light intensity value based on at least part of the third set of pixels in the respective second analyzed image, thereby giving rise to second target light intensity values for the second analyzed images; and
    correct the target light intensity values, based on the second target light intensity values, to at least reduce a second effect of second changes in an internal light of given internal light sources within the space on the target light intensity values.

11. A method for detecting movement of at least one non-line-of-sight object, the method comprising:
    obtaining a sequence of at least two successive images acquired by a camera, each of the successive images including a first set of pixels representing a target, being at least part of a first visible object located within a line-of-sight of the camera, and a second set of pixels representing a reference, being at least part of a second visible object located within the line-of-sight of the camera, wherein the first visible object is impacted by (i) light that is scattered from the non-line-of-sight object present within a space outside the line-of-sight of the camera and (ii) ambient light, and wherein the second visible object is impacted by the ambient light;

analyzing at least two images of the sequence for detecting the movement within the space, if any, the at least two images of the sequence being analyzed images, by calculating, for each analyzed image of the analyzed images,
- (a) at least one target light intensity value based on at least part of the first set of pixels in the respective analyzed image, thereby giving rise to target light intensity values for the analyzed images,
- (b) at least one reference light intensity value based on at least part of the second set of pixels in the respective analyzed image, thereby giving rise to reference light intensity values for the analyzed images, and
- (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and detecting the movement within the space upon a variation between the compensated light intensity values across given images of the analyzed images meeting a criterion.

12. The method of claim 11, wherein: (a) the target light intensity value is represented by a temporal target equation and (b) the reference light intensity value is represented by a temporal reference equation, and wherein the method further comprises:

inferring a common signal represented in both the temporal reference equation and a part of the temporal target equation that represents a temporal change in the target light intensity value due to the ambient light that pervades into the space and illuminates the target in order to reduce a variance of the compensated light intensity values.

13. The method of claim 11, wherein the compensated light intensity value is calculated by dividing the target light intensity value by the reference light intensity value.

14. The method of claim 11, wherein the second visible object is not impacted by the light that is scattered from the non-line-of-sight object present within the space outside the line-of-sight of the camera.

15. The method of claim 11, wherein at least some of the ambient light is emitted by an external non-natural light source for illuminating the non-line-of-sight object.

16. The method of claim 11, further comprising:
automatically selecting the target by analyzing at least one image of the sequence.

17. The method of claim 11, further comprising:
automatically selecting the reference by analyzing at least one image of the sequence.

18. The method of claim 11, wherein the criterion is a predefined temporal variation between the compensated light intensity values across the given images that is met or exceeded.

19. The method of claim 11, further comprising:
obtaining a second sequence of at least two second successive images acquired by a second camera, having a higher sampling rate than a sampling rate of the camera, each of the second successive images including a third set of pixels representing the target;

analyzing at least two second images of the second sequence, the at least two second images of the second sequence being second analyzed images, by calculating, for each second analyzed image of the second analyzed images, at least one second target light intensity value based on at least part of the third set of pixels in the respective second analyzed image, thereby giving rise to second target light intensity values for the second analyzed images; and correcting the target light intensity values, based on the second target light intensity values, to at least reduce a second effect of second changes in an internal light of given internal light sources within the space on the target light intensity values.

20. A non-transitory computer readable storage medium having computer readable program code embodied therewith, the computer readable program code, executable by at least one processor of a computer to perform a method for detecting movement of at least one non-line-of-sight object, the method comprising:

obtaining a sequence of at least two successive images acquired by a camera, each of the successive images including a first set of pixels representing a target, being at least part of a first visible object located within a line-of-sight of the camera, and a second set of pixels representing a reference, being at least part of a second visible object located within the line-of-sight of the camera, wherein the first visible object is impacted by (i) light that is scattered from the non-line-of-sight object present within a space outside the line-of-sight of the camera and (ii) ambient light, and wherein the second visible object is impacted by the ambient light;

analyzing at least two images of the sequence for detecting the movement within the space, if any, the at least two images of the sequence being analyzed images, by calculating, for each analyzed image of the analyzed images,
- (a) at least one target light intensity value based on at least part of the first set of pixels in the respective analyzed image, thereby giving rise to target light intensity values for the analyzed images,
- (b) at least one reference light intensity value based on at least part of the second set of pixels in the respective analyzed image, thereby giving rise to reference light intensity values for the analyzed images, and
- (c) at least one compensated light intensity value, being the target light intensity value as modified, based on the reference light intensity value, to reduce an effect, on the target light intensity value, of changes in the ambient light between a first time at which a given image of the sequence is acquired and a second time at which the respective analyzed image is acquired, thereby giving rise to compensated light intensity values for the analyzed images; and detecting the movement within the space upon a variation between the compensated light intensity values across given images of the analyzed images meeting a criterion.

* * * * *